United States Patent [19]
Leber et al.

[11] Patent Number: 5,787,756
[45] Date of Patent: Aug. 4, 1998

[54] MULTISPEED POWERSHIFT REVERSING GEAR

[75] Inventors: Fritz Leber, Friedrichshafen, Germany; Wolfgang Rebholz, Flowery Branch, Ga.

[73] Assignee: ZF Friedrichshafen AB, Friedrichshafen, Germany

[21] Appl. No.: 817,836

[22] PCT Filed: Dec. 9, 1995

[86] PCT No.: PCT/EP95/04859

§ 371 Date: Apr. 30, 1997

§ 102(e) Date: Apr. 30, 1997

[87] PCT Pub. No.: WO96/18834

PCT Pub. Date: Jun. 20, 1996

[30] Foreign Application Priority Data

Dec. 16, 1994 [DE] Germany ............ 44 44 843.0

[51] Int. Cl.[6] .................................. F16H 3/093
[52] U.S. Cl. ................................................ 74/331
[58] Field of Search ................................... 74/331

[56] References Cited

U.S. PATENT DOCUMENTS 4,464,947 8/1984 Windsor-smith et al. ............ 74/331
5,249,475 10/1993 McAskill .
5,524,500 6/1996 Rebholz et al. .
5,592,853 1/1997 Rebholz et al. .

FOREIGN PATENT DOCUMENTS

| 25 35 700 | 2/1977 | Germany . |
| 42 42 941 A1 | 6/1994 | Germany . |
| 42 42 942 A1 | 6/1994 | Germany . |
| 44 16 930 A1 | 11/1995 | Germany . |
| 1 129 838 | 5/1996 | Germany . |

*Primary Examiner*—Dirk Wright
*Attorney, Agent, or Firm*—Davis and Bujold

[57] ABSTRACT

The invention relates to a multispeed powershift reversing gear. To achieve a compact design, especially an axially short construction, in a multiseed reversing gear each countershaft has mounted on it a single clutch, an idler gear and up to two fixed gears. Gearwheels of reversing fear form a drive gear set, a distributor gear set and s driven gear chain. Besides the ratio of the drive gear set, a different ratio related to another clutch is established through an independent drive chain consisting of a fixed gear and an idler gear with a clutch. With the same essential design, different gear configurations can be constituted with different numbers of gears and different center distances. The reversing gear is especially designed for use in construction machinery.

6 Claims, 1 Drawing Sheet

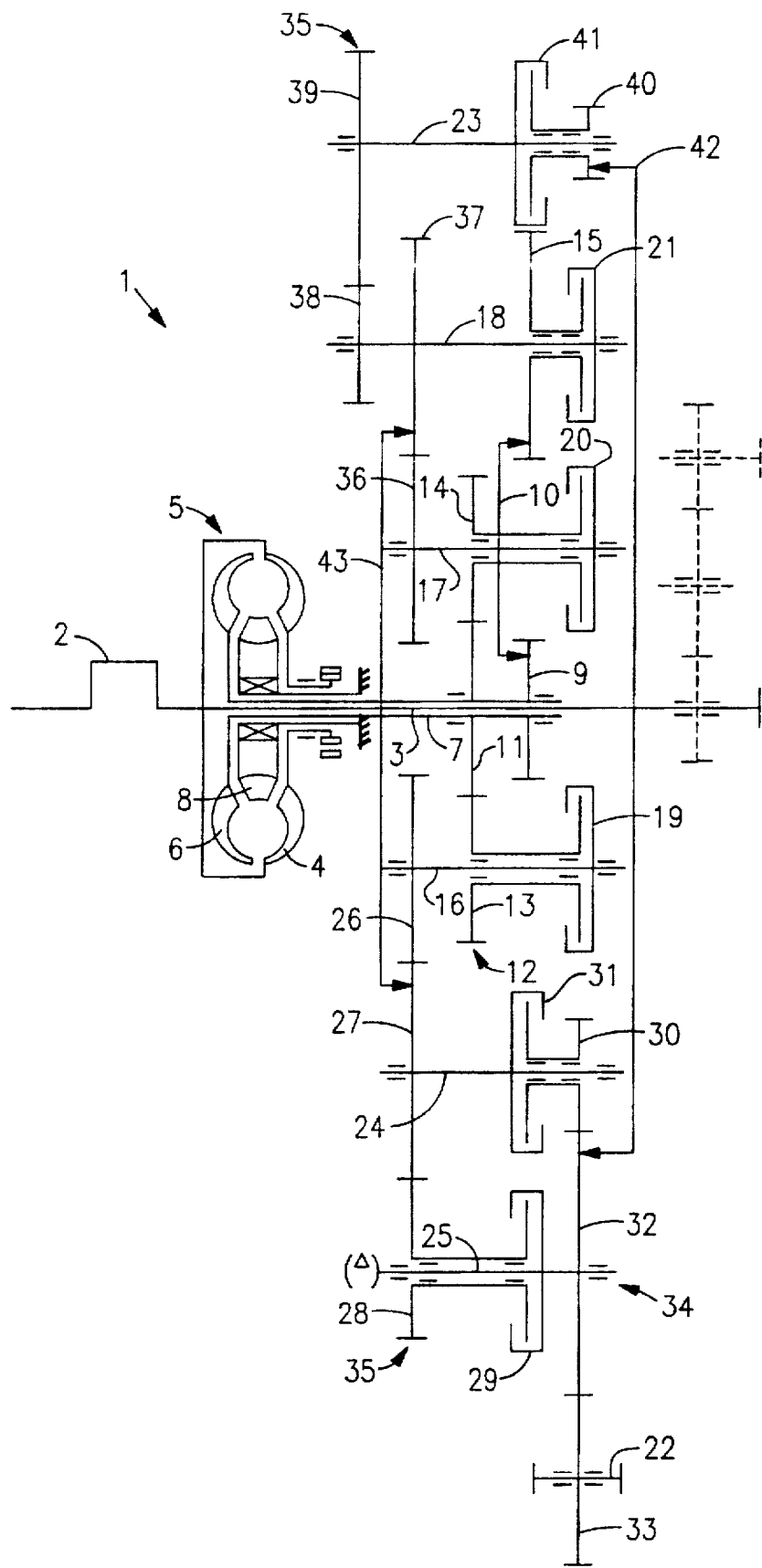

MULTISPEED POWERSHIFT REVERSING GEAR

The invention relates to a multispeed powershift reversing gear having one output shaft, countershafts and gearwheels which form a drive gear set and, mounted upon the countershafts, clutches with idler gears optionally non-rotatably connectable with one of the countershafts for a change of speed and direction, and a driven gear chain having at least one fixed gear.

In construction machinery in use today, gears, which can be basically divided in two groups, are used. It is characteristic that a hydrostatic drive unit is front-mounted on the powershift gear for one group. In said gear, the speed and torque of the front-mounted group are adapted by hydraulic or electro-hydraulic controls.

The prevailing number of used gears belongs to the other group of the powershift gear with a front-mounted hydrodynamic torque converter. By means of said drive unit, it is possible to obtain a continuous and automatic torque increase, as the working resistance of the motor vehicle such as a construction machine increases. It is possible here to generate gear input torques which substantially correspond to triple the value of the engine torque. This is important because unlike the case of passenger vehicles, the work is carried out with a gear or converter. In a wheel loader, for example, the bucket is pushed into the earth to be carried. The filling is broken up and lifted. To load, the vehicle is reversed, the bucket is further lifted and unloaded. The torque conversion is a great advantage precisely at low speeds and great speed differences between the input and the output.

The converter can be complemented by a converter ridge clutch. By means of said clutch, it is possible to obtain within the gears, at high speeds, considerable savings in consumption.

The flow of energy in the individual gears is produced by a combination of hydraulically shiftable clutches. Said clutches must, among other things, be shiftable for reversal under load and, therefore, consume much energy. The design of the housing or the arrangement of the shafts of the gear must be adapted to a specific use. Typical uses for a reversing gear are in dumps, loaders, excavators, and lift trucks, but also in vehicles operated on the road such as motor cranes. A specific center distance between the input and output shafts of the gear is required, depending on the type of vehicle. Long center distances are to be used, for example, when the bending angle of universal joint shafts must be kept small. In this case, the reversing gear assumes an additional function as a distributor gear.

In motor cranes, the reversing gear has only one output shaft. A smaller center distance is required due to space conditions.

Most cases need at least one power takeoff driven in accordance with engine speed, for example, the hydraulic system of the working machine. In addition to the power takeoff, a lubricant pump and a shift pump are also provided, which are likewise operated according to engine speed.

The tasks to be performed by a reversing gear are varied, being determined by the design of the vehicle.

DE-A 11 29 838 has disclosed a reversing gear which stands out by a small axial length. Upon one input shaft is a fixed gear which is in constant meshing contact with fixed gears upon a reversing shaft and a countershaft. All idler gears are on one side of the gear and constantly mesh with each other. Between each idler and fixed gear is situated one friction clutch. In this reversing gear already known, the structural design of the friction clutches, in particular the arrangement of the disc sets, the support of the idler gears upon the countershafts and also the indirect support of the countershaft on the side of the idler gears, is in itself relatively expensive.

DE-A 25 35 700 has disclosed a reversing gear where the friction clutches are designed as double clutches. In this gear, it is possible to obtain a relatively high number of speeds, but a larger space in an axial direction is needed, since up to four gearwheels and one double clutch have to be placed on one countershaft.

The problem to be solved by this invention is to provide a powershift reversing gear, which has a small axial length and allows different variants with regard to the drive ratios, the possible number of speeds and the required center distance.

The problem, which the invention solves, is based on the following facts, a single clutch is situated on each countershaft; one fixed gear and idler gears in constant meshing contact therewith form a drive gear set, and another fixed gear with one idler gear forms a drive chain uncoupled from the drive gear set; one fixed gear situated upon the countershaft is in constant meshing contact with idler gears and forms a driven gear chain; and the countershafts are interconnected by fixed gears and one idler gear which form a distributor gear set.

From several points of view, the proposed solution offers the following advantages; a single clutch is provided for each countershaft. Hereby an axially short design results even in a six-speed reversing gear. The countershafts have a small flexure due to their short length. They can be supported without problem on both sides of roller bearings in the transmission housing. The idler used gears have each a single meshing of teeth; they are not used as intermediate gears. Due to the constant center distances, the reduction ratio of the drive gear set between the directional clutches cannot be changed to forward and reverse. However, in order to provide a possibility of obtaining different ratios in relation to another directional and/or gearshift clutch, another fixed gear is provided upon the input shaft. Said fixed gear is in constant meshing connection with one idler gear with which said clutch is coordinated. Thus, an uncoupling of the tooth number of the input gearwheel of the drive gear set takes place so that different ratios can be produced.

Advantageous structural embodiments are to be deduced from claims 2 to 5.

Other features essential to the invention and the advantages resulting therefrom are to be understood from the description that follows of several embodiments of a powershift reversing gear.

The FIGURE shows a gear diagram of a powershift reversing gear 1. It is a reversing gear having a maximum of six forward and three reverse gears. A diagrammatically shown engine 2 drives an input shaft 3 of the reversing gear. The input shaft 3 is non-rotatably connected with an impeller 4 of a hydrodynamic torque converter 5. A turbine wheel 6 of the hydrodynamic torque converter transmits the input power to a hollow shaft 7 which lies concentrically in relation to the input shaft 3.

The hydrodynamic torque converter 5 is completed by a stator 8 supported on a free wheel.

A fixed gear 11, which forms the input gear of a drive gear set 12, is non-rotatably situated upon the hollow shaft 7. Idler gears 13 and 14 belong to said drive gear set 12. The fixed gear 11 is in constant tooth meshing with said idler gears 13 and 14. The idler gears 13 and 14 are supported on respective countershafts 16 and 17.

A clutch 19 and a clutch 20, respectively, are coordinated with idler gear 13 and idler gear 14.

Another fixed gear 9, which is in constant tooth meshing with an idler gear 15, is non-rotatably situated upon the hollow shaft 7.

The idler gear 15 is supported on a countershaft 18. A clutch 21 is coordinated with the former.

Both fixed gears 11 and 9, together with the drive gear set 12, form an independent drive chain consisting of the fixed gear 9 and the idler gear 15. With constant center distances, the reduction ratio within the drive gear set 12 between the clutch 19 and the clutch 20 cannot be changed. The independent drive chain offers the possibility of providing, on the basis of clutch 21, different ratios which are independent of the ratio of the drive gear set 12. Accordingly, an uncoupling from the tooth number of the fixed gear 11 of the drive gear set 12 occurs for the drive of the clutch 20.

When the clutch 19 is engaged, the idler gear 13 is non-rotatably connected with the countershaft 16. The idler gear 14 is coupled to the countershaft 17 when the clutch 20 is actuated. If the clutch 21 is engaged, a non-rotatable connection exists between the idler gear 15 and the countershaft 18. The clutches 19, 20 and 21 allow a reversal of direction of rotation of an output shaft 22 of the reversing gear 1. For this reason, the clutches 19, 20 and 21 are designated also as directional clutches.

In addition to the countershafts 16, 17 and 18 and the output shaft 22, the reversing gear has other countershafts 23, 24 and 25.

Besides the idler gear 13, a fixed gear 26 is situated upon the countershaft 16. The fixed gear 26 is in constant tooth meshing with a fixed gear 27 of the countershaft 24. The fixed gear 27 can assume the function of an intermediate gear. An idler gear 28, which is in contact with the fixed gear 27 of the countershaft 24, is situated upon the countershaft 25. A clutch 29, through which the idler gear 28 can be non-rotatably connected with the countershaft 25, is coordinated with the idler gear 28.

An idler gear 30 is rotatably supported upon the countershaft 24. The idler gear 30 can be non-rotatably connected with the fixed gear 27 by means of another clutch 31.

When the clutch 31 is engaged, the input flows via the idler gear 30 to a fixed gear 32 of the countershaft 25.

A fixed gear 33, which is in constant driving connection with the fixed gear 32 of the countershaft 25, is situated upon the countershaft 22 of the reversing gear.

The idler gear 30 and the fixed gears 32 and 33 form a drive gear chain 34.

The fixed gears 26, 27 and the idler gear 28 belong to a distributor gear set 35 which is completed by another fixed gear 36 on the countershaft 17, two fixed gears 37 and 38 on the countershaft 18, and one fixed gear 39 on the countershaft 23.

An idler gear 40, which by a clutch 41 can be non-rotatably connected with the countershaft 23, is on the countershaft 23. The idler gear 40 is in constant tooth meshing with the fixed gear 32, which is indicated by line 42. The idler gear 40 thus belongs to the driven gear chain 34.

The fixed gear 27 is in meshed contact with the fixed gear 37 of the distributor gear set 35 which is made clear by line 43 as shown. The idler gear 15 of the counter-shaft 18 meshes with the fixed gear 9, as results from line 10 as shown.

The clutches 41, 31, and 29, together with the directional clutches mentioned, serve for a change in speed and are designated as speed clutches. For each speed, one directional and one speed clutch are engaged.

From the above explained design of the reversing gear 1, it results that the countershafts 16 and 17, respectively, have one idler gear 13 and 14 of the drive gear set 12 and one fixed gear 26 and 36 of the distributor gear set 35.

The clutch 21 is both a directional and speed clutch. The fixed gears 37 and 38 of the distributor gear set are supported, together with the idler gear 15, upon the countershaft 18. The speed and direction of rotation of all gearwheels of the distributor gear set 35 are defined upon actuation of one of the directional clutches 19, 20 and 21.

Each one of the countershafts 23, 24, and 25, upon which are situated the clutches 41, 31, and 29 (speed clutches), accommodates one fixed gear 39, 27, and one idler gear 28 of the distributor gear set 35 and one idler gear 40, 30, respectively, and one fixed gear 32 of the driven wheel chain 34. If the reversing gear 1 is operated in a four-speed version, the following ratios apply:

| Speed | Engaged Clutches |
|---|---|
| 1 | 19 and 41 |
| 2 | 19 and 31 |
| 3 | 19 and 29 |
| 4 | 21 and 29 |
| 1R | 20 and 41 |
| 2R | 20 and 31 |
| 3R | 20 and 29 |

For a six-speed version in which the clutches 19 and 21 are used as so-called split clutches, the following ratios apply:

| Speed | Engaged Clutches |
|---|---|
| 1 | 19 and 41 |
| 2 | 21 and 41 |
| 3 | 19 and 31 |
| 4 | 21 and 31 |
| 5 | 19 and 29 |
| 6 | 21 and 29 |
| 1R | 20 and 41 |
| 2R | 20 and 31 |
| 3R | 20 and 29 |

| Reference numerals | |
|---|---|
| 1 reversing gear | 23 countershaft |
| 2 engine | 24 countershaft |
| 3 input shaft | 25 countershaft |
| 4 impeller | 26 fixed gear |
| 5 torque converter | 27 fixed gear |
| 6 turbine wheel | 28 idler gear |
| 7 hollow shaft | 29 clutch |
| 8 stator | 30 idler gear |
| 9 fixed gear | 31 clutch |
| 10 line | 32 fixed gear |
| 11 fixed gear | 33 fixed gear |
| 12 drive gear set | 34 driven gear chain |
| 13 idler gear | 35 distributor gear set |
| 14 idler gear | 36 fixed gear |
| 15 idler gear | 37 fixed gear |
| 16 countershaft | 38 fixed gear |
| 17 countershaft | 39 fixed gear |
| 18 countershaft | 40 idler gear |
| 19 clutch | 41 clutch |
| 20 clutch | 42 line |
| 21 clutch | 43 line |
| 22 output shaft | |

We claim:

1. A multispeed powershift reversing gear (1) having at least one input shaft (3, 7), a plurality of countershafts (16, 17, 18, 23, 24 and 25) and a plurality of gearwheels (11, 13 and 14) which form a drive gear set (12) and clutches (19, 20, 21, 29, 31 and 41) with idler gears (13, 14, 15), which can optionally be non-rotatably connected with one of said countershafts, are situated upon said countershafts for changing speed and direction, and a driven gear chain (34) having at least one fixed gear (12), wherein a single clutch (19, 20, 21, 29, 31 and 41) is situated upon each countershaft (16, 17, 18, 23, 24 and 25), and idler gears (13, 14), in constant meshing contact therewith, form a drive gear set (12) and another fixed gear (9) with one idler gear (15) form a drive chain uncoupled from said drive gear set (12), both fixed gears (11 and 9) are fastened to said input shaft (7), one fixed gear (32), situated upon one countershaft (25), is in constant meshing contact with two idler gears (30, 40) and forms a driven gear chain (34), and said countershafts (16, 17, 18, 23, 24 and 25) are interconnected by fixed gears (26, 27, 36, 37, 38 and 39) and one idler gear (28) which form a distributor gear set (35).

2. A multispeed powershift reversing gear (1) according to claim 1, wherein one clutch (21), used as one of a directional clutch and a speed clutch, is coordinated with said idler gear (15).

3. A multispeed powershift reversing gear (1) according to claim 1, wherein said clutch (21) and said idler gear (15) are situated upon said countershaft (18).

4. A multispeed powershift reversing gear (1) according to claim 1, wherein said countershaft (18) has two fixed gears (37 and 38) of said distributor gear set (36).

5. A multispeed powershift reversing gear (1) according to claim 1, wherein said fixed gears (11, 9) are situated upon a hollow shaft (7) lying concentrically in relation to an input shaft (3).

6. A multispeed powershift reversing gear (1) according to claim 1, wherein said clutch (21), coordinated with said idler gear (15), serves to engage a fourth speed.

* * * * *